Oct. 11, 1932.    M. S. HALPERN    1,881,525
NONGLARE LIGHT PROJECTOR
Filed Nov. 3, 1930
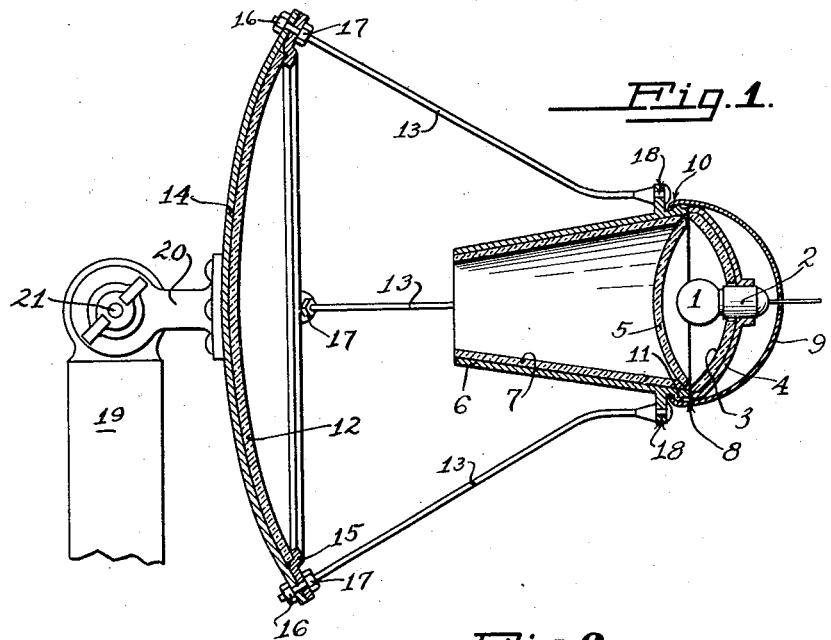
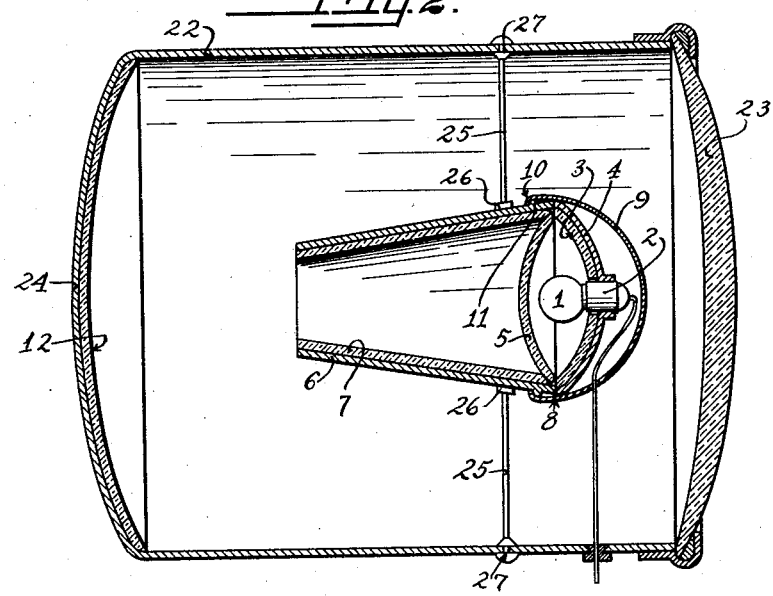
INVENTOR,
MENDEL S. HALPERN.
BY
ATTORNEY.

Patented Oct. 11, 1932

1,881,525

UNITED STATES PATENT OFFICE

MENDEL S. HALPERN, OF OAKLAND, CALIFORNIA

NONGLARE LIGHT PROJECTOR

Application filed November 3, 1930. Serial No. 493,172.

My invention consists of a non-glare light projector of a type suitable for use as a flood light, automobile head light and the like, and has been designed with the primary purpose in mind of overcoming the defects of prior projectors of this class, without increasing the cost of manufacture.

The advantage and improvements of my invention will more clearly appear from the accompanying drawing and the following description, in which I illustrate and describe a preferred form and one modification of my invention.

In the accompanying drawing:

Figure 1 is a vertical section of a light projector embodying my invention.

Figure 2 is a vertical section of an automobile headlight showing the adaptability of my invention thereto.

As shown in Figure 1 of the drawing, my invention consists of the novel arrangements of a light source 1, mounted in a socket 2, of known construction, which is seated in the center of a concave primary reflector 3, and extends on through the metal backing 4 for the said reflector. The reflector 3 consists of a silvered glass instead of the usual highly polished metal, since I have found that glass maintains its reflectiveness more uniformly and for greater periods of time than polished metal. Then too it is more readily cleaned.

A convex filtration lens 5, of translucent glass or other refractory material having like filtration properties, is placed before the lamp, with its periphery abutting the rim of the primary reflector 3. I employ a conical light tube 6 for the purpose of concentrating the rays reflected from the reflector 3, and producing a beam of considerable density. The attainment of this object is facilitated by placing a conical mirrored glass 7 within the light tube 6. The glass 7 serves further to mellow or soften the light projected therethrough. The large end of the tube 6, being of the same circumference as the metal backing plate 4, their peripheries are abutted, as at 8, to form a housing for the light source, primary reflector and lens. The periphery of the larger end of the conical glass 7, is bevelled inwardly to accommodate the filtration lens 5, for the purpose of holding it firmly in place.

For the purpose of enhancing the appearance of my projector, I provide an additional cover 9 for the light source and primary reflecting unit. The lip of this cup-shaped cover is turned inwardly, as at 10, to engage the shoulder 11 provided on the conical light tube, adjacent its larger end.

This primary unit of my invention is held in spaced relation to a secondary reflector 12, by means of a plurality of rods 13, which extend through the rim of the backing plate 14, and the reflector retaining hoop 15, and engaged by the nuts 16 and 17. These rods are secured to the light tube by means of the ears 18, the ends thereof extending through the said ears and being beaded.

In Figure 1, I show my invention adapted for use as a flood light, being mounted on the post 19, by means of the adjustable bracket 20, provided with the set screw 21.

In Figure 2, of the drawing, I show my invention embodied in an automobile headlight. In this adaptation, I show a complete housing for both the primary unit of my invention as well as the secondary reflector. I have provided a cylindrical housing 22, with a transparent closure 23, for its front, open end. The rear, closed end of the housing 22, is pressed outwardly as at 24, to accommodate the concave secondary reflector 12.

The primary unit of my invention is supported within the housing 22, and in spaced relation to the secondary reflector 12, by means of a plurality of rods 25 secured to the plates 26, which are welded or suitably affixed to the outer wall of the light tube 6, adjacent its larger end. The opposite ends of the rods 25 extend through the wall of the housing 22, and are beaded on the inside and outside as at 27.

It will then be seen that when the light emanating from the lamp 1, is projected from the primary reflector 3, it is filtered by the lens 5, passes through the glass inner cone 7, of the light tube 6, and is directed upon the secondary reflector 12. The light ray during this process of reflection, has been mellowed and softened and its glare effectively removed, without impairing the intensity of the illumination produced.

As in the case of the primary reflector 3, I employ silvered glass or mirrors in the conical glass tube 7 fitted inside of the light tube 6, as well as for the secondary reflector 12. Thus there is always present in my device a maximum degree of uniformity in the reflectiveness of these surfaces.

While I show two forms in which my invention may be readily used, I appreciate that there are many additional modifications where it can be effectively employed. Therefore, I do not wish to be limited to the precise forms I have shown and described, but only to the extent of the appended claims.

Having thus described my invention, what I claim is:

1. A light projector of the class described, comprising a light source, a concave reflector for said light source, a conical shaped light directing tube having its larger end adjacent the periphery of said reflector, a filtering lens in the large end of said tube and a second reflector having its central portion opposite and spaced from the smaller end of said tube for directing the light rays past said light source.

2. A light projector of the class described, comprising a light source, a concave reflector for said light source, a conical shaped light directing tube having its larger end adjacent the periphery of said reflector, a filtering lens impinged between the larger end of said tube and the periphery of said reflector, and a second reflector having its central portion opposite and spaced from the smaller end of said tube for directing the light rays past said light source.

MENDEL S. HALPERN.